US008270945B2

(12) United States Patent
Byun

(10) Patent No.: US 8,270,945 B2
(45) Date of Patent: Sep. 18, 2012

(54) MONITORING APPARATUS AND METHOD IN A MOBILE COMMUNICATION SYSTEM

(75) Inventor: Dong-Woo Byun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 692 days.

(21) Appl. No.: 12/068,812

(22) Filed: Feb. 12, 2008

(65) Prior Publication Data

US 2008/0194250 A1 Aug. 14, 2008

(30) Foreign Application Priority Data

Feb. 12, 2007 (KR) ........................ 10-2007-0014244

(51) Int. Cl.
*H04M 1/66* (2006.01)
(52) U.S. Cl. .................. 455/410; 455/456.1; 455/456.2; 455/417; 455/404.2; 455/414.2; 379/35; 379/32.01; 379/32.05; 379/133; 379/112.01; 379/114.14; 379/142.07; 379/85
(58) Field of Classification Search ............... 455/414.2, 455/9, 456.2, 456.1, 417, 410, 404.2; 379/35, 379/32.01, 32.05, 133, 112.01, 114.14, 142.07, 379/85
See application file for complete search history.

(56) References Cited

U.S. PATENT DOCUMENTS

| 6,738,902 B1 * | 5/2004 | Ruppert et al. ............... 713/162 |
| 7,123,710 B2 * | 10/2006 | Ravishankar ............... 379/221.1 |
| 7,277,702 B2 * | 10/2007 | Ropolyi et al. ............... 455/433 |
| 7,570,743 B2 * | 8/2009 | Barclay et al. ............... 379/35 |
| 7,606,577 B2 * | 10/2009 | Caspi et al. ............... 455/456.1 |
| 2002/0051518 A1 * | 5/2002 | Bondy et al. ............... 379/35 |
| 2003/0101356 A1 * | 5/2003 | Miettinen et al. ............... 713/201 |
| 2003/0174695 A1 * | 9/2003 | Lautenschlager et al. ..... 370/352 |
| 2003/0215069 A1 * | 11/2003 | Hitzeman ............... 379/88.19 |
| 2004/0117654 A1 * | 6/2004 | Feldman et al. ............... 713/201 |
| 2004/0157629 A1 * | 8/2004 | Kallio et al. ............... 455/466 |
| 2004/0165709 A1 * | 8/2004 | Pence et al. ............... 379/201.01 |
| 2004/0202295 A1 * | 10/2004 | Shen et al. ............... 379/112.01 |
| 2004/0218731 A1 * | 11/2004 | Karimi-Cherkandi et al. ............... 379/32.01 |
| 2004/0228362 A1 * | 11/2004 | Maki et al. ............... 370/467 |
| 2005/0076117 A1 * | 4/2005 | Hou et al. ............... 709/224 |
| 2005/0094651 A1 * | 5/2005 | Lutz et al. ............... 370/401 |
| 2005/0094773 A1 * | 5/2005 | Peterson ............... 379/35 |
| 2005/0180446 A1 * | 8/2005 | Flowers et al. ............... 370/428 |

FOREIGN PATENT DOCUMENTS

KR 1020040075600 8/2004
KR 1020060025458 3/2006

* cited by examiner

*Primary Examiner* — Kwasi Karikari
(74) *Attorney, Agent, or Firm* — Roylance, Abrams, Berdo & Goodman, LLP

(57) ABSTRACT

A monitoring apparatus and method in a mobile communication system are provided. A WGW receives information relating to a monitored subscriber from a WSS, establishes a monitoring path between the monitored subscriber and a monitoring server, upon request from the WSS, begins to monitor the monitored subscriber upon receipt of a monitoring start request from the WSS, and transmits monitored data to the monitoring server.

15 Claims, 8 Drawing Sheets

MONITORING APPARATUS AND METHOD IN A MOBILE COMMUNICATION SYSTEM

CROSS-REFERENCE TO RELATED PATENT APPLICATION

This application claims the benefit under 35 U.S.C. §119 (a) of a Korean Patent Application filed in the Korean Intellectual Property Office on Feb. 12, 2007 and assigned Serial No. 2007-14244, the entire disclosure of which is hereby incorporated by reference.

BACKGROUND OF THE INVENTION

1. Field of the Invention

The present invention generally relates to an apparatus and method for monitoring. More particularly, the present invention relates to an apparatus and method for applying a monitoring technology to a MEdia GAteway COntrol (MEGACO) protocol.

2. Description of the Related Art

In a legacy mobile communication system, an equipment handles both signaling and a bearer. Therefore, an exchange is required to directly control a voice processor in order to support a monitoring function. This results in an operation of its application program which is dependent on hardware.

By contrast, signaling is separated from a bearer in a packet-based Voice over Internet Protocol (VoIP) technology. This allows a media gateway that handles the bearer to be less dependent on hardware. In other words, products made by different manufacturers may be used. In this situation, media gateways from many manufacturers should perform the same monitoring function. However, a standard monitoring function has not been specified.

FIG. 1 illustrates a conventional network configuration using a MEGACO protocol.

Referring to FIG. 1, conventional media gateways 110 and 120 can perform monitoring once bearers are converted to IP packets. This means that there is no monitoring between terminals 140 and 150 of subscribers and the media gateways 110 and 120.

While the media gateways 110 and 120 convert voice signals to IP packets for voice data destined for the other party, they do not convert direct tones and announcements for subscribers to IP packets.

For monitoring between the terminals 140 and 150 and the media gateways 110 and 120, the monitoring function should be supported in the case of interworking between media gateways of different manufacturers. However, the present MEGACO protocol standard has not defined the monitoring function.

Accordingly, there is a need for an improved system and method to facilitate the configuration and the use of a monitoring network without a dependence on hardware.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a monitoring apparatus and method for a MEGACO protocol.

Another aspect of exemplary embodiments of the present invention provides an apparatus and method to facilitate monitoring between a media gateway and a subscriber terminal by providing external user bearers when a MEGACO protocol is used.

A further aspect of exemplary embodiments of the present invention provides an apparatus and method to define a new monitoring function, when a MEGACO protocol is used.

According to an aspect of exemplary embodiments of the present invention, a monitoring method of a Wireless Gate-Way (WGW) in a mobile communication system is provided. Information relating to a monitored subscriber is received from a wireless soft switch (WSS), a monitoring path is established between the monitored subscriber and a monitoring server. Upon request from the WSS, monitoring of the monitored subscriber starts and once a monitoring start request is received from the WSS, monitored data is transmitted to the monitoring server.

According to another aspect of an exemplary embodiment of the present invention, a WGW is provided to perform monitoring in a mobile communication system, in which a communication module communicates with another node. A controller receives information relating to a monitored subscriber from a WSS through the communication module, establishes a monitoring path between the monitored subscriber and a monitoring server, upon request from the WSS, starts monitoring the monitored subscriber, upon receipt of a monitoring start request from the WSS, and transmits monitored data to the monitoring server. A storage unit stores information required to monitor the monitored subscriber and operating the controller.

According to yet another aspect of an exemplary embodiment of the present invention, a monitoring method of a WSS in a mobile communication system is provided. Based on this method, information relating to a monitored subscriber and a registration request for the monitored subscriber are received from a monitoring server and the monitored subscriber is registered. When a call is created for the monitored subscriber, a notification that the call is to be monitored is provided to a WGW by providing information relating to the monitored subscriber. The WGW is requested to establish a communication path between the WGW and the monitoring server and the WGW is requested to start monitoring.

According to still another aspect of exemplary embodiments of the present invention, a WSS for performing monitoring in a mobile communication system is provided. A communication module communicates with another node, a controller receives information relating to a monitored subscriber and a registration request for the monitored subscriber from a monitoring server, registers the monitored subscriber, notifies, when a call is created for the monitored subscriber, a WGW that the call is to be monitored by providing information relating to the monitored subscriber, requests the WGW to establish a communication path between the WGW and the monitoring server, and requests start of monitoring to the WGW, and a storage unit stores information required to monitor the monitored subscriber and operating the controller.

According to still a further aspect of exemplary embodiments of the present invention, a monitoring method of a monitoring server in a mobile communication system is provided, in which information relating to a monitored subscriber is transmitted, registration of the monitored subscriber is requested, a communication path for monitoring is established to a WGW, and data relating to the monitored subscriber is received from the WGW.

According to yet another aspect of exemplary embodiments of the present invention, a monitoring server for performing monitoring in a mobile communication system is provided, in which a communication module communicates with another node, a controller provides information relating to a monitored subscriber, requests registration of the monitored subscriber, establishes a communication path for monitoring to a WGW, and receives data relating to the monitored subscriber from the WGW, and a storage unit stores information required to monitor the monitored subscriber and to operate the controller.

According to yet a further aspect of exemplary embodiments of the present invention, a monitoring system in a mobile communication system is provided, in which a monitoring server provides information relating to a monitored subscriber, requests registration of the monitored subscriber, establishes a communication path for monitoring to a WGW, and receives data relating to the monitored subscriber from the WGW. A WSS receives the information relating to the monitored subscriber and the registration request for the monitored subscriber from the monitoring server, registers the monitored subscriber, notifies, when a call is created for the monitored subscriber, the WGW that the call is to be monitored by providing information relating to the monitored subscriber, requests the WGW to establish a communication path between the WGW and the monitoring server, and requests start of monitoring to the WGW. The WGW receives the information relating to the monitored subscriber from the WSS, establishes a monitoring path between the monitored subscriber and the monitoring server, upon request from the WSS, starts monitoring the monitored subscriber upon receipt of a monitoring start request from the WSS, and transmits monitored data to the monitoring server.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

According to an exemplary embodiment of the present invention, a monitoring apparatus and method for a MEGACO protocol is provided. According to an exemplary embodiment of the present invention, a monitoring function is added to a WSS and a WGW.

According to another exemplary embodiment of the present invention, a network is configured to include network entities.

Figure 1:
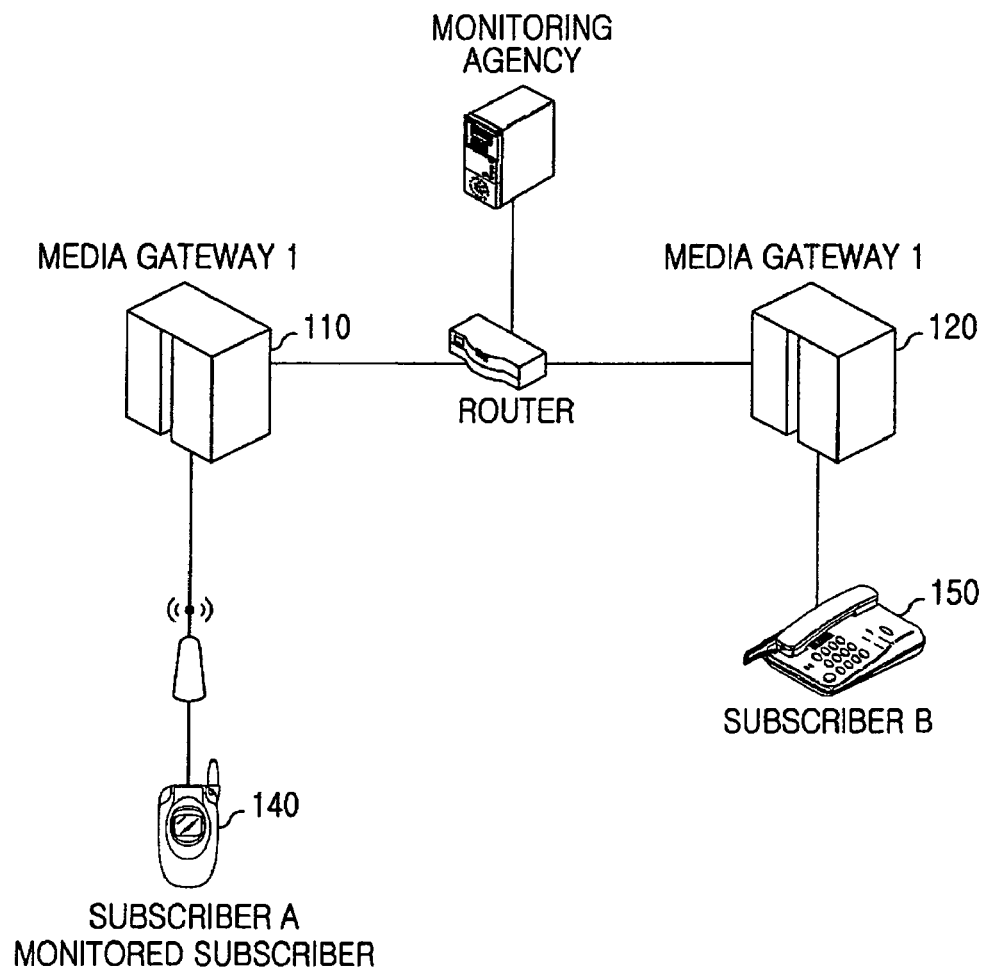
FIG. 1 illustrates a conventional network configuration using a MEGACO protocol.
Figure 2:
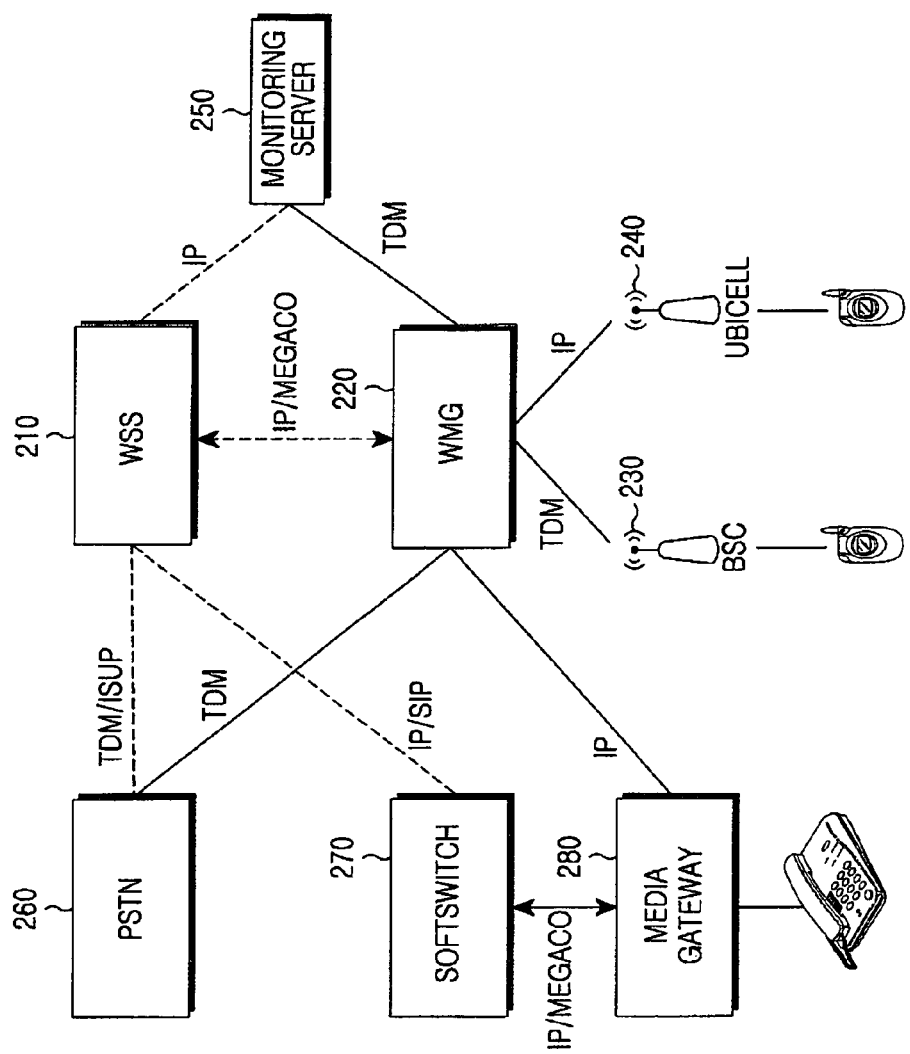
FIG. 2 illustrates a network configuration using a MEGACO protocol supporting a monitoring function according to an exemplary embodiment of the present invention.

FIG. 2 illustrates a network configuration using a MEGACO protocol supporting a monitoring function according to an exemplary embodiment of the present invention.

Referring to FIG. 2, a WSS 210 connects a call and provides an additional service based on information relating to the locations of terminals. According to an exemplary embodiment of the present invention, the WSS 210 monitors a particular subscriber upon request from a monitoring server 250, when a call is connected to the subscriber.

A WMG 220 connects or converts voice data between a terminal and another network. According to an exemplary embodiment of the present invention, the WMG 220 monitors voice data between subscribers and provides the monitored data to the monitoring server 250.

A Base Station Controller (BSC) 230 and a UbiCell 240 convert radio signals received from terminals to wired signals and transmit data to the WSS 210 and the WMG 220. The monitoring server 250 commands monitoring of a particular subscriber and collects monitored data associated with the subscriber based on court approval.

The WSS 210 is connected to another network. The network may be a Public Switched Telephone Network (PSTN) 260, or a soft switch 270 or a media gateway 280 in another network system. Since all voice data from the PSTN 260 or another network system is connected to the WMG 220, any type of voice signal connected to a subscriber may be monitored.

Figure 3:
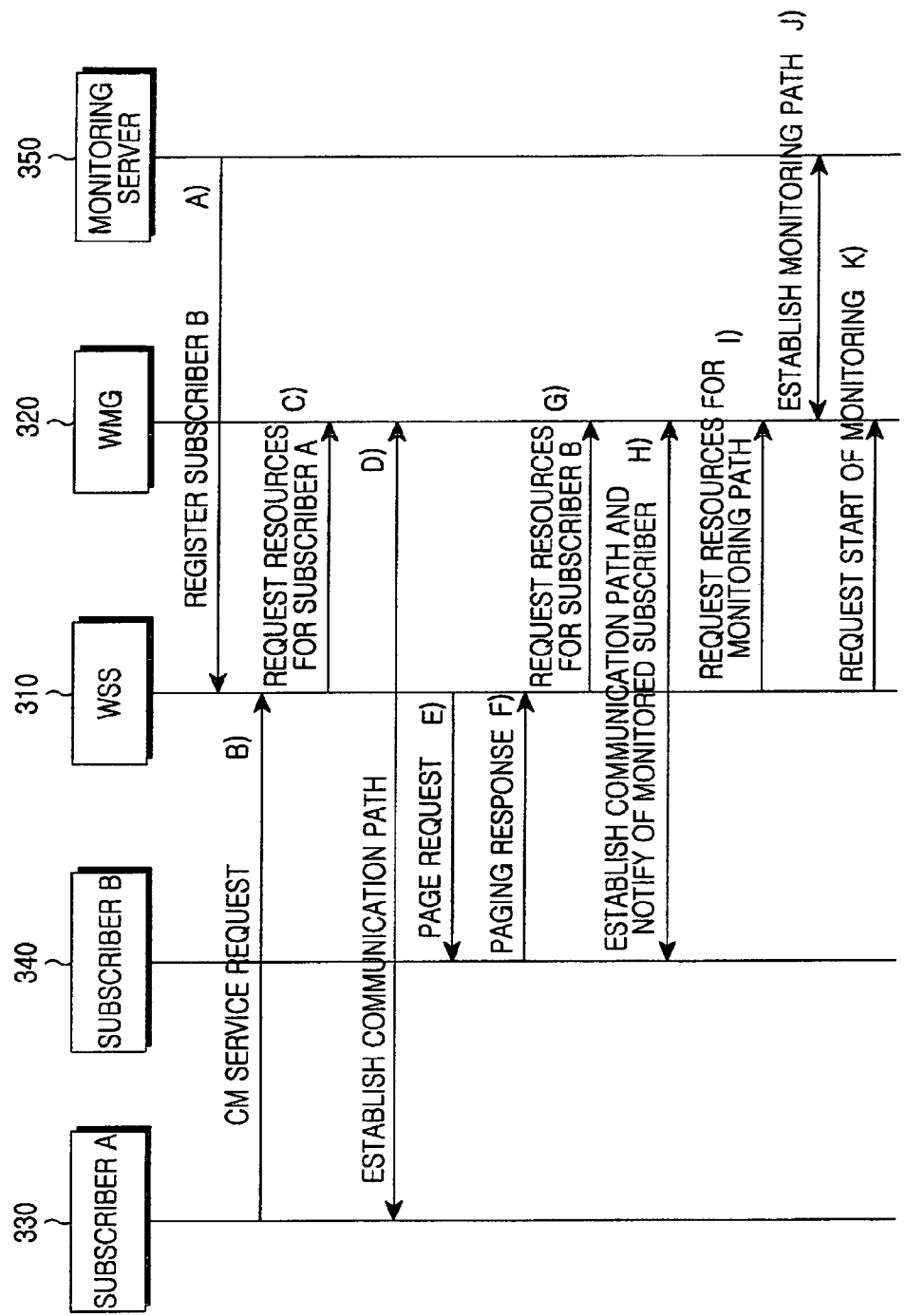
FIG. 3 is a diagram illustrating the flow of a signal in the operation of a network using the MEGACO protocol supporting the monitoring function according to an exemplary embodiment of the present invention.

FIG. 3 is a diagram illustrating the flow of a signal for an operation of the network using the MEGACO protocol supporting the monitoring function according to an exemplary embodiment of the present invention.

Referring to FIG. 3, steps h) to k) are added to support the monitoring function according to an exemplary embodiment of the present invention.

A monitoring server 350 registers a subscriber 340 (subscriber B) to be monitored (a monitored subscriber) to a WSS 310 in step a).

Upon receipt of a Connection Management (CM) Service Request requesting a call with subscriber B from a subscriber 330 (subscriber A) in step b), the WSS 310 requests resources to the WMG 320 to establish a communication path to subscriber A in step c).

In step d), the communication path is established between subscriber A and the WMG 320.

The WSS 310 pages subscriber B by notifying subscriber B of the call request in step e). Upon receipt of a response for the call request from subscriber B in step f), the WSS 310 requests resources for establishing a communication path to subscriber B to the WMG 320 in step g).

The communication path is established between subscriber B and the WMG 320. The WSS 310 notifies the WMG 320 that subscriber B is to be monitored in step h).

In step i), the WSS 310 requests resources to the WMG 320, for a monitoring path.

The monitoring path is established between the WMG 320 and the monitoring server 350 in step j). The WMG 320 then receives a monitoring start request from the WSS 310 and starts to monitor subscriber B in step k).

As described above, when monitoring is performed through packet mirroring outside the WMG 320, the monitoring is limited in its range.

That is, voice signals from subscribers reach the WMG in different media forms based on the types of the terminals of the subscribers. For example, a voice signal from a Code Division Multiple Access 2000 1x (CDMA 2000 1x) subscriber arrives at the WMG via a Time Division Multiplexing (TDM) DS0 line. A voice signal from a PSTN subscriber reaches the WMG via an analog line.

Voice input to the WMG is transferred to the other party as commanded by the WSS. If the two parts use different media, media conversion takes place in a media converter.

Conventional packet mirroring-based monitoring equipment preferably monitors a voice signal that is converted to an IP packet in the media converter. Therefore, it is not capable of monitoring a particular path.

That is, to fully monitor all types of voice signals from subscribers, the WMG conducts monitoring as illustrated in FIG. 3.

Figure 4:
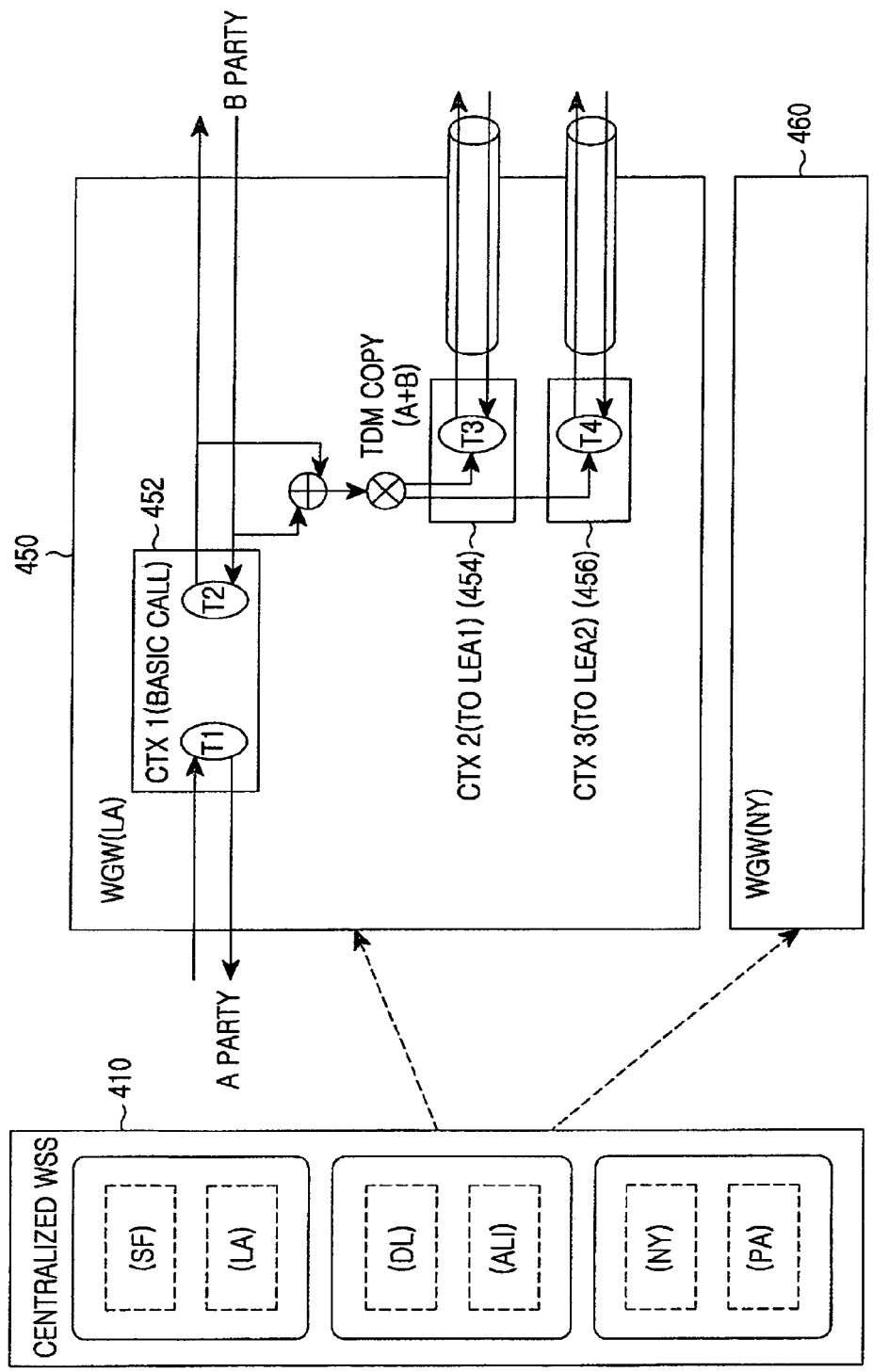
FIG. 4 illustrates connections between a Wireless Soft Switch (WSS) and Wireless GateWays (WGWs) according to an exemplary embodiment of the present invention.

FIG. 4 illustrates connections between a WSS and WGWs according to an exemplary embodiment of the present invention.

Referring to FIG. 4, a WSS may be connected to a plurality of WGWs 450, 460. When an exemplary embodiment of the present invention is applied to a termination to be monitored (such as an equipment of a monitored subscriber), all bearers connected to the monitored termination are provided to a monitoring server via trunks connected to the monitoring server.

A centralized WSS 410 may be connected to WGWs at different locations (for example, SF, LA, NY, . . . ). A WGW 450 provides two TDM copies 454, 456 of a packet for a basic call 452 to the centralized WSS 410.

This process may be realized by using a new package added to the MEGACO protocol. This package is illustrated below.

TABLE 1

| | |
|---|---|
| Package Name | The name of the package |
| Package ID | Scalea (x0x0100) |
| Description | Support L1 function |
| Version | 1 |
| Extends | None |

Table 1 illustrates the new package added according to an exemplary embodiment of the present invention, including the name, ID, description, and version information of the package. Table 2 illustrates services supported by the package.

TABLE 2

| | |
|---|---|
| Property ID | Service(0x0001) |
| Description | Indicate that the termination is added, for transfer of monitoring information |
| Type | Enumeration |
| Possible Values | Src(0x0001): monitored termination<br>Dest(0x0002): LEA Termination |
| Defined in | Termination State |
| Characteristics | Read/Write |
| Description | Termination of the package always includes the property value in Add message. |

Table 2 indicates that a termination (a call connection) added by the new package of the present invention is a connection added to transmit monitoring information. It represents implementation of the monitoring service of the present invention that connects a call for monitoring. LEA (Law Enforcement Agency) represents the monitoring server. Src represents the monitored termination and Dest represents the monitoring server.

The service specified in Table 2 includes a lower mode depicted in Table 3.

TABLE 3

| | |
|---|---|
| Property ID | DestMode(0x0002) |
| Description | indicate monitoring mode of LEA termination |
| Type | Enumeration |
| Possible Values | on(0x0001): monitoring on<br>off(0x0002): monitoring off |
| Defined in | Termination State |
| Characteristics | Read/Write |
| Description | indicate monitoring mode of LEA termination |

Table 3 depicts the lower mode of the service provided by the new package of an exemplary embodiment of the present invention, which indicates a monitoring mode (monitoring on, monitoring off).

Table 4 through Table 7 illustrates available monitoring properties when the monitoring mode is on in Table 3.

TABLE 4

| | |
|---|---|
| Property Name | Distribute Call Contents |
| Property ID | dcc(0x0003) |
| Description | Command distribution of bearers passing through the termination to L1 terminations |
| Type | Brief |
| Duration | None |
| Defined in | Termination State |

Table 4 illustrates a command of distributing bearers passing through a monitoring connection to predetermined connections (nodes).

TABLE 5

| | |
|---|---|
| Parameter Name | Mode |
| ParameterID | mode(0x0001) |
| Description | Is used to collect bearers related to the termination separately according to rx and tx |
| Type | Enumeration |
| Optional | Yes |
| Possible Values | tx(0x0001): collect and distribute outgoing bearers destined for the other party from a subscriber<br>rx(0x0002): collect and distribute incoming bearers to a subscriber from the other party<br>both(0x0003): collect and distribute all bearers passing through the termination |
| Default | Both |

Table 5 illustrates an indication of a monitoring mode (reception only, transmission only, or both) for use in the monitoring connection.

TABLE 6

| Parameter Name | Destination Context |
|---|---|
| ParameterID | DestCxt(0x0002) |
| Description | ContextID having TerminationID allocated to monitoring server |
| Type | Integer |
| Optional | No |
| Possible Values | ContextID |
| Default | None |

Table 6 illustrates a ContextID allocated to the monitored termination.

TABLE 7

| Parameter Name | Destination Termination |
|---|---|
| ParameterIP | DestTerm(0x0003) |
| Description | TerminationID allocated to the monitoring server |
| Type | Integer |
| Optional | No |
| Possible Values | TerminationID |
| Default | None |

Table 7 illustrates a TerminationID allocated to the monitored termination.

Figure 5:
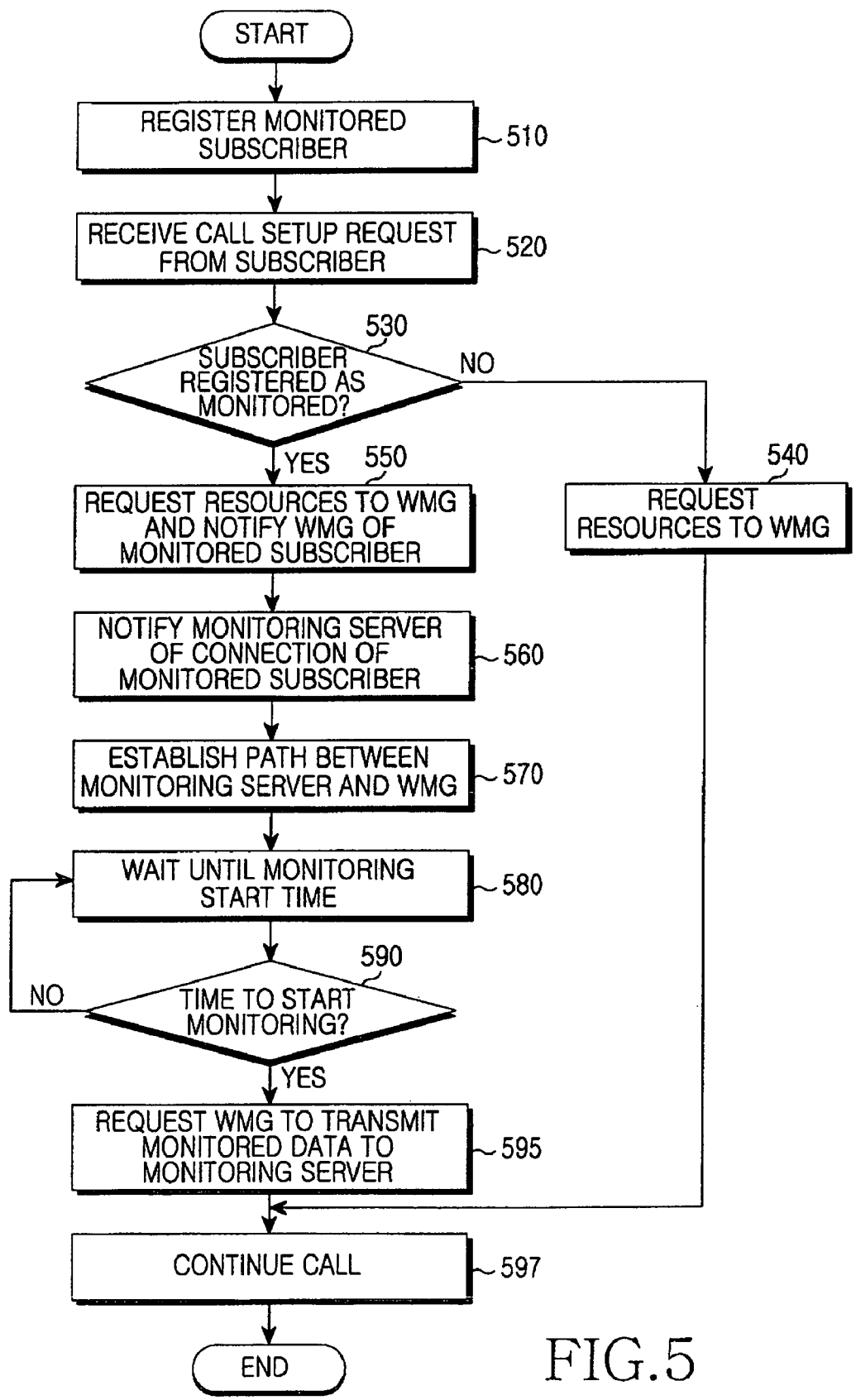
FIG. 5 is a flowchart of an operation of a Wireless Media Gateway (WMG) using the MEGACO protocol supporting the monitoring function according to an exemplary embodiment of the present invention.

FIG. 5 is a flowchart of an operation of a network entity using the MEGACO protocol supporting the monitoring function according to an exemplary embodiment of the present invention. The network entity is a WSS.

Referring to FIG. 5, the WSS registers a monitoring subscriber from the monitoring server in step 510. The registration can be performed using Table 2. In Table 2, Src represents a monitored termination, such as a monitored subscriber. During the registration, the type of monitoring may be decided by using Table 4 and Table 5. IDs may also be allocated to the monitored subscriber and a monitoring context for the monitored subscriber by using Table 6 and Table 7.

Once a call request is received from a subscriber in step 520, the WSS determines whether a called subscriber is a monitored subscriber in step 530.

If the called subscriber is not a monitored subscriber, the WSS requests resources for the calling subscriber to the WMG in step 540. The WSS continues the call in step 597 and ends the algorithm of an exemplary embodiment of the present invention. If the called subscriber is not a monitored subscriber, the call is processed in a conventional manner.

If the called subscriber is a monitored subscriber, the WSS requests resources for the calling subscriber to the WMG and establishes a communication path to the calling subscriber. When the called subscriber responds to the call, the WSS establishes a communication path to the monitored subscriber and notifies the WMG that the called subscriber is a monitored subscriber in step 550. In step 560, the WSS notifies the monitoring server of the connection of the monitored subscriber.

Information relating to a monitoring type may be delivered by using Table 4 and Table 5. The ID of the monitored subscriber and the ID of the monitoring context for the monitored subscriber may be transferred by using Table 6 and Table 7.

In step 570, the WSS controls the WMG to establish a monitoring path between the monitoring server and the WMG. The WSS waits until a monitoring start time in step 580. When it is time to start the monitoring in step 590, the WSS requests the WMG to transmit data from the calling subscriber or data from the monitored subscriber to the monitoring server in a predetermined manner in step 595. At the monitoring start time, the monitoring can begin by using Table 3.

The monitoring start time may be an instant in time in which the WSS sends a request for the WMG to start the monitoring.

The WSS continues monitoring the call in step 597 and ends the algorithm of an exemplary embodiment of the present invention.

Figure 6:
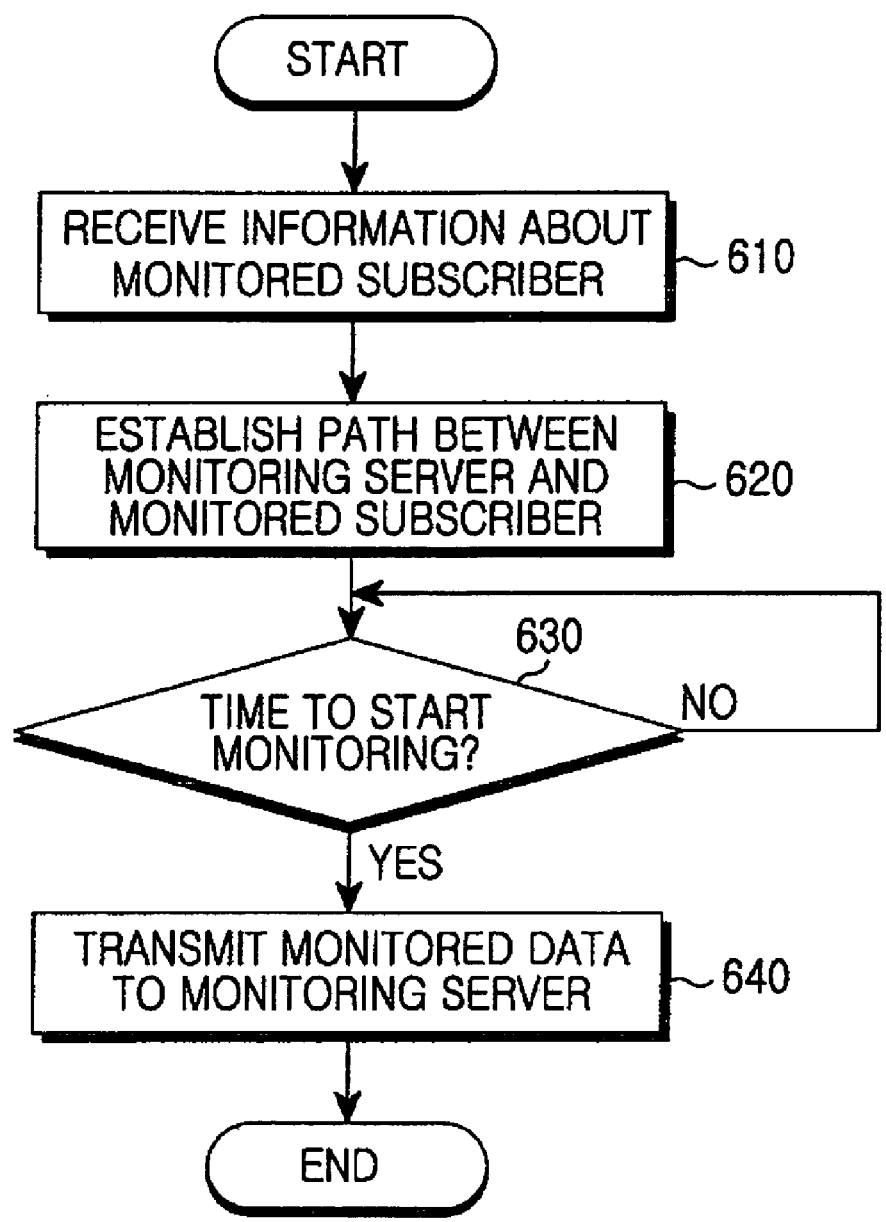
FIG. 6 is a flowchart of an operation of the WMG using the MEGACO protocol supporting the monitoring function according to an exemplary embodiment of the present invention.

FIG. 6 is a flowchart of an operation of a WMG using the MEGACO protocol supporting the monitoring function according to an exemplary embodiment of the present invention.

Referring to FIG. 6, the WMG receives information relating to a monitored subscriber from the WSS in step 610. The type of monitoring may be decided by using Table 1, Table 4 and Table 5. An ID allocated to the monitored subscriber and an ID allocated to a monitoring context for the monitored subscriber may be discovered by using Table 6 and Table 7.

Once a request to establish a path to the monitored subscriber from the WSS has been received, the WMG establishes a monitoring path in step 620. When it is time to start the monitoring in step 630, the WMG transmits data relating to the monitored subscriber to the monitoring server in step 640. The monitoring start time may be an instant in time in which the WMG receives a monitoring start request from the WSS.

Then, the WMG ends the algorithm of an exemplary embodiment of the present invention.

Figure 7:
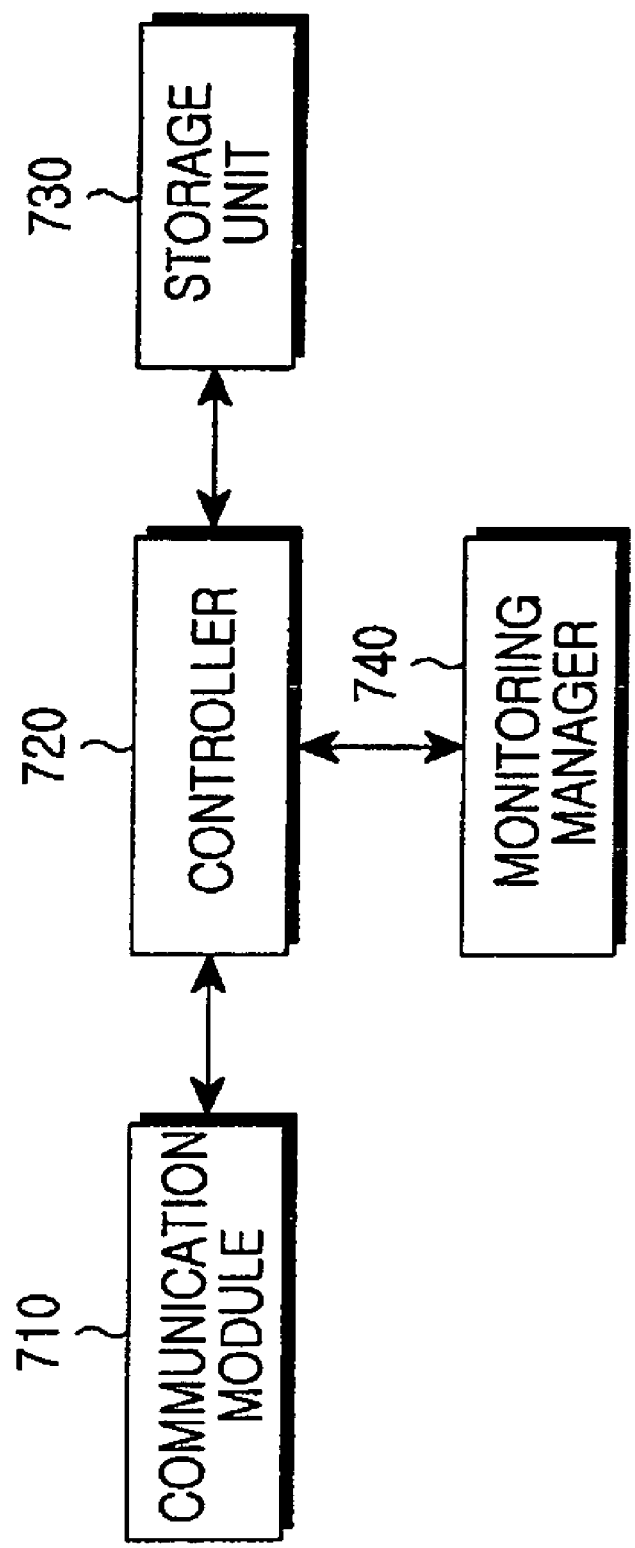
FIG. 7 is a block diagram of a network entity using the MEGACO protocol supporting the monitoring function according to an exemplary embodiment of the present invention.

FIG. 7 is a block diagram of a network entity using the MEGACO protocol supporting the monitoring function according to an exemplary embodiment of the present invention. The network entity is the WSS or the monitoring server.

Referring to FIG. 7, in the WSS, a communication module 710 includes a baseband processor for communication with another node, and a wired or radio process module when required. A signal received through the wired or radio process module is converted to a baseband signal in the baseband processor and provided to a controller 720.

The controller 720 provides overall control to the WSS. That is, the controller 720 provides overall control to a switching function and controls a monitoring manager 740 to perform a monitoring function based on the monitoring information relating to a monitored subscriber received from the monitoring server.

The monitoring manager 740 monitors the monitored subscriber according to a command and information received from the controller 720. For example, the monitoring manager 740 provides information relating to the monitored subscriber, context information, monitoring on/off information, and monitoring mode information to the WMG so that the WMG performs the monitoring function.

A storage unit 730 stores programs for controlling the entire operation of the WSS and temporary data generated while executing the programs.

The controller 720 may perform the functions of the monitoring manager 740. While the controller 720 and the monitoring manager 740 are separately configured herein for illustrative purposes, the functions of the monitoring manager 740 may be entirely or partially incorporated into the controller 720 during real implementation.

Referring to FIG. 7, in the monitoring server, the communication module 710 includes the baseband processor for communication with another node, and the wired or radio process module when required. A signal received through the wired or radio process module is converted to a baseband signal in the baseband processor and provided to the controller 720.

The controller 720 provides overall control to the apparatus. That is, the controller 720 provides overall control to a monitoring function and controls the monitoring manager 740 to provide necessary information relating to the monitored subscriber to the WSS, for the monitoring function.

The monitoring manager 740 provides information required to monitor the monitored subscriber to the WSS. For example, the monitoring manager 740 provides information relating to the monitored subscriber, context information, monitoring on/off information, and monitoring mode information to the WSS, for the monitoring function.

The storage unit 730 stores programs for controlling the entire operation of the apparatus and temporary data generated during executing the programs.

The controller 720 may perform the functions of the monitoring manager 740. While the controller 720 and the monitoring manager 740 are separately configured herein for illustrative purposes, the functions of the monitoring manager 740 may be entirely or partially incorporated into the controller 720 in real implementation.

Figure 8:
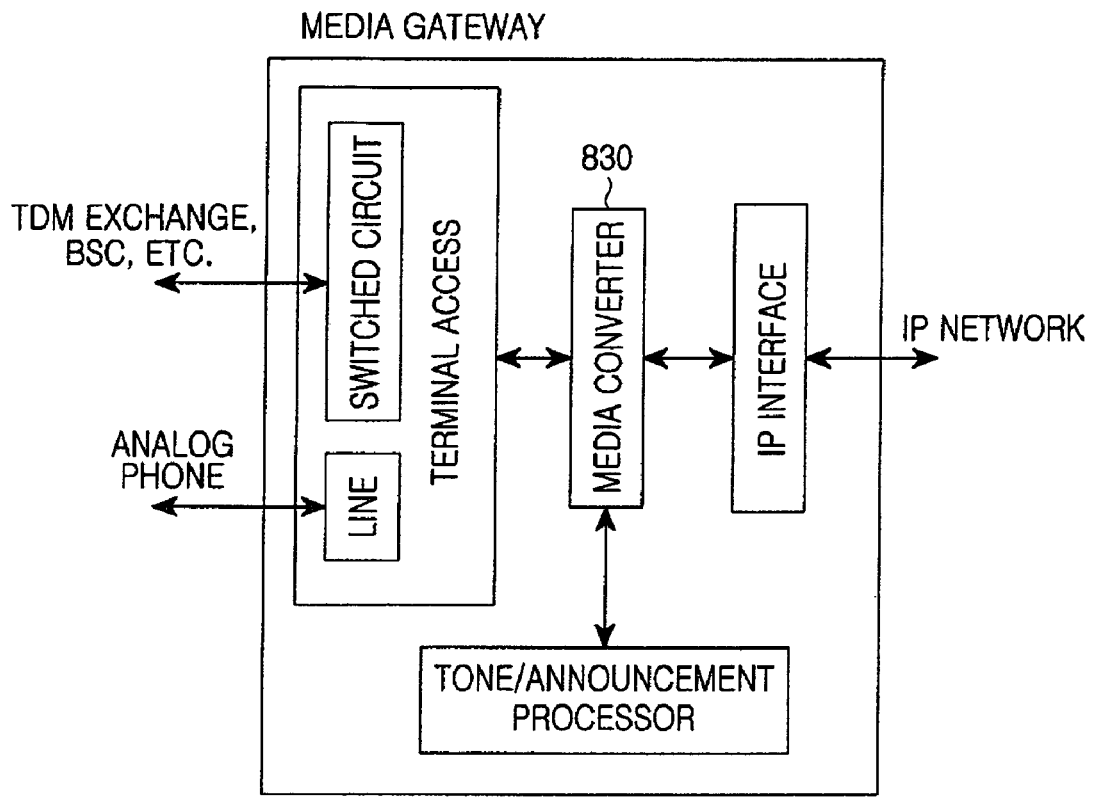
FIG. 8 is a block diagram of the WMG according to an exemplary embodiment of the present invention.

FIG. 8 is a block diagram of the WMG according to an exemplary embodiment of the present invention.

Referring to FIG. 8, as stated before, voice signals from subscribers reach the WMG in different media forms according to the types of the terminals of the subscribers.

For example, a voice signal from a CDMA 2000 1x subscriber arrives at the WMG via a TDM DS0 line. A voice signal from a PSTN subscriber reaches the WMG via an analog line. The voice input to the WMG is provided to the other party as commanded by the WSS. If both parts use different media types, media conversion occurs in a media converter 830.

When the media converter 830 is connected to a PSTN subscriber, tones suitable for the PSTN should be generated. Hence, the media converter 830 generates the tones through a tone/announcement processor. An IP interface takes charge in interfacing with an IP network. A terminal access provides appropriate interfacing to a connected device.

While not shown in FIG. 8, the WMG may further include a controller, a monitoring manager, and a storage unit in addition to the communication module.

The controller provides overall control to the apparatus. That is, the controller controls the overall media conversion function and controls the monitoring manager to perform a monitoring function based on monitoring information relating to a monitored subscriber received from the WSS.

The monitoring manager monitors the monitored subscriber according to a command and information received from the controller. For example, the monitoring manager provides information relating to the monitored subscriber, context information, monitoring on/off information, and monitoring mode information to the monitoring server during the monitoring function.

The storage unit stores programs for controlling the entire operation of the apparatus and temporary data generated during the execution of the programs.

The controller may perform the functions of the monitoring manager. While the controller and the monitoring manager are separately configured herein for illustrative purposes, the functions of the monitoring manager may be entirely or partially incorporated into the controller in real implementation.

Exemplary embodiments of the present invention advantageously facilitate the configuration and the use of a monitoring network without depending on hardware by providing a monitoring technology to an existing MEGACO protocol.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A monitoring method of a Wireless GateWay (WGW) in a mobile communication system, the method comprising:
   receiving, at the WGW, information relating to a monitored subscriber and monitoring type information from a Wireless Soft Switch (WSS);
   establishing a monitoring path between the WGW and a monitoring server and a communication path between the WGW and the monitored subscriber, upon request from the WSS; and
   monitoring the monitored subscriber at the WGW according to the monitoring type information and transmitting monitored data from the WGW to the monitoring server, upon receipt of a monitoring start request from the WSS, wherein the monitoring type information indicates one monitoring type from a selection of reception only monitoring, transmission only monitoring, reception and transmission monitoring, and monitoring information distribution,
   wherein the monitoring type information comprises information related to a context given to monitor information and the monitoring type information is stored in at least one table.

2. The monitoring method of claim 1, wherein the information relating to the monitored subscriber is at least one of an Identifier (ID) of the monitored subscriber, and information relating to a context given to monitored information.

3. A Wireless GateWay (WGW) for performing monitoring in a mobile communication system, the WGW comprising:
   a communication module for communicating with another node;
   a controller for receiving information relating to a monitored subscriber and monitoring type information from a Wireless Soft Switch (WSS) through the communication module, establishing a monitoring path to a monitoring server and a communication path to the monitored subscriber upon request from the WSS, monitoring the monitored subscriber according to the monitoring type information upon receipt of a monitoring start request from the WSS, and transmitting monitored data to the monitoring server, wherein the monitoring type information indicates one monitoring type from a selection of reception only monitoring, transmission only monitoring, reception and transmission monitoring, and monitoring information distribution; and
   a storage unit for storing information required for monitoring the monitored subscriber and operating the controller,
   wherein the monitoring type information comprises information related to a context given to monitor information and the monitoring type information is stored in at least one table.

4. The WGW of claim 3, wherein the information relating to the monitored subscriber is at least one of an Identifier (ID) of the monitored subscriber, and information relating to a context given to monitored information.

5. A monitoring method of a Wireless Soft Switch (WSS) in a mobile communication system, the method comprising:

receiving information relating to a monitored subscriber, monitoring type information, and a registration request for the monitored subscriber from a monitoring server;

registering the monitored subscriber;

notifying, when a call is created for the monitored subscriber, a Wireless GateWay (WGW) that the call is to be monitored by providing information relating to the monitored subscriber and the monitoring type information to the WGW;

requesting the WGW establish a monitoring path between the WGW and the monitoring server and a communication path between the WGW and the monitored subscriber; and requesting the WGW to monitor the monitored subscriber according to the monitoring type information, after requesting establishment of the communication path, wherein the monitoring type information indicates at least one monitoring type from a selection of reception only monitoring, transmission only monitoring, reception and transmission monitoring, and monitoring information distribution, wherein the monitoring type information comprises information related to a context given to monitor information and the monitoring type information is stored in at least one table.

6. The monitoring method of claim 5, wherein the information relating to the monitored subscriber is at least one of an Identifier (ID) of the monitored subscriber, and information relating to a context given to monitored information.

7. A Wireless Soft Switch (WSS) for performing monitoring in a mobile communication system, the WSS comprising:

a communication module for communicating with another node;

a controller for receiving information relating to a monitored subscriber, monitoring type information, and a registration request for the monitored subscriber from a monitoring server, registering the monitored subscriber, notifying, when a call is created for the monitored subscriber, a Wireless GateWay (WGW) that the call is to be monitored by providing information relating to the monitored subscriber and the monitoring type information to the WGW, requesting the WGW to establish a monitoring path between the WGW and the monitoring server and a communication path between the WGW and the monitored subscriber, and requesting the WGW to monitor the monitored subscriber according to the monitoring type information, wherein the monitoring type information indicates at least one monitoring type from a selection of reception only monitoring, transmission only monitoring, reception and transmission monitoring, and monitoring information distribution; and a storage unit for storing information required for monitoring the monitored subscriber and operating the controller, wherein the monitoring type information comprises information related to a context given to monitor information and the monitoring type information is stored in at least one table.

8. The WSS of claim 7, wherein the information relating to the monitored subscriber is at least one of an Identifier (ID) of the monitored subscriber, and information relating to a context given to monitored information.

9. A monitoring method of a monitoring server in a mobile communication system, the method comprising:

providing information relating to a monitored subscriber and monitoring type information to a Wireless Soft Switch (WSS), and requesting registration of the monitored subscriber;

establishing a monitoring path to a Wireless GateWay (WGW) for receiving monitored data of the monitored subscriber, after the WGW establishes a communication path with the monitored subscriber; and receiving data relating to the monitored subscriber from the WGW according to the monitoring type information, wherein the monitoring type information indicates at least one monitoring type from a selection of reception only monitoring, transmission only monitoring, reception and transmission monitoring, and monitoring information distribution, wherein the monitoring type information comprises information related to a context given to monitor information and the monitoring type information is stored in at least one table.

10. The monitoring method of claim 9, wherein the information relating to the monitored subscriber is at least one of an Identifier (ID) of the monitored subscriber, and information relating to a context given to monitored information.

11. A monitoring server for performing monitoring in a mobile communication system, the server comprising:

a communication module for communicating with another node;

a controller for providing information relating to a monitored subscriber and monitoring type information to a Wireless Soft Switch (WSS), for requesting registration of the monitored subscriber, and for establishing a monitoring path to a Wireless GateWay (WGW) for receiving data relating to the monitored subscriber from the WGW according to the monitoring type information, wherein the monitoring path is established after the WGW establishes a communication path to the monitored subscriber, and wherein the monitoring type information indicates at least one monitoring type from a selection of reception only monitoring, transmission only monitoring, reception and transmission monitoring, and monitoring information distribution; and a storage unit for storing information required for monitoring the monitored subscriber and for operating the controller, wherein the monitoring type information comprises information related to a context given to monitor information and the monitoring type information is stored in at least one table.

12. The monitoring server of claim 11, wherein the information relating to the monitored subscriber is at least one of an Identifier (ID) of the monitored subscriber, and information relating to a context given to monitored information.

13. A monitoring system in a mobile communication system, the system comprising:

a monitoring server for providing information relating to a monitored subscriber and monitoring type information, requesting registration of the monitored subscriber, establishing a monitoring path to a Wireless GateWay (WGW), and receiving data relating to the monitored subscriber according to the monitoring type information from the WGW;

a Wireless Soft Switch (WSS) for receiving the information relating to the monitored subscriber, the monitoring type information, and the registration request for the monitored subscriber from the monitoring server, registering the monitored subscriber, notifying the WGW that a call is to be monitored by providing the information relating to a monitored subscriber and the monitoring type information to the WGW when a call is created for the monitored subscriber, requesting the WGW to establish a communication path to the monitored subscriber, requesting the WGW to establish a monitoring path between the WGW and the monitoring server, and requesting the WGW to monitor the monitored subscriber; and the WGW for receiving the information relating to the monitored subscriber and the monitoring type information from the WSS, establishing a communication path to the monitored subscriber and establishing a monitoring path to the monitoring server upon request from the WSS, monitoring the monitored subscriber according to the monitoring type information upon receipt of a monitoring start request from the WSS, and transmitting monitored data to the monitoring server, wherein the monitoring type information indicates at least one monitoring type from a selection of reception only monitoring, transmission only monitoring, reception and transmission monitoring, and monitoring information distribution, wherein the monitoring type information comprises information related to a context given to monitor information and the monitoring type information is stored in at least one table.

14. The monitoring system of claim 13, wherein the information relating to the monitored subscriber is at least one of an Identifier (ID) of the monitored subscriber, and information relating to a context given to monitored information.

15. The monitoring system of claim 13, wherein the WSS, the WGW and the monitoring server perform monitoring by a MEdia GAteway Control (MEGACO) protocol.

* * * * *